Figure 1:
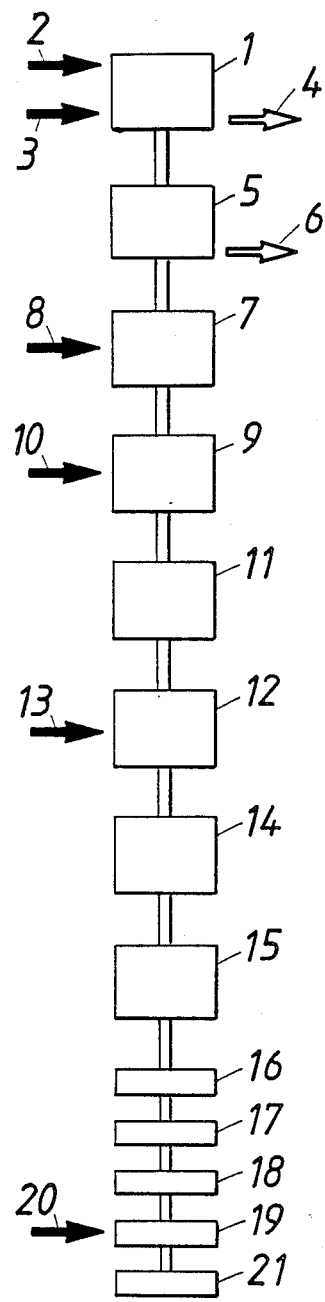

United States Patent [19]

Pachernegg

[11] Patent Number: 4,810,505

[45] Date of Patent: Mar. 7, 1989

[54] PROCESS OF PRODUCING A CARBONATED HOP-MALT BEVERAGE

[76] Inventor: Rudolf Pachernegg, Maria Theresia Strasse 22, A-4600 Wels, Austria

[21] Appl. No.: 83,852

[22] PCT Filed: Nov. 4, 1986

[86] PCT No.: PCT/AT86/00070

§ 371 Date: Jul. 1, 1987

§ 102(e) Date: Jul. 1, 1987

[87] PCT Pub. No.: WO87/02699

PCT Pub. Date: May 7, 1987

[30] Foreign Application Priority Data

Nov. 4, 1985 [AT] Austria ................................ 3164/85

[51] Int. Cl.$^4$ ........................ C12C 11/04; A23L 1/185
[52] U.S. Cl. ........................................ 426/16; 426/11; 426/28; 426/29
[58] Field of Search ..................... 426/12, 16, 11, 28, 426/29; 99/323.2

[56] References Cited

U.S. PATENT DOCUMENTS

| | | | |
|---|---|---|---|
| 1,117,613 | 11/1914 | Wahl | 426/16 |
| 3,066,026 | 11/1962 | Shaler | 426/16 |
| 4,399,744 | 8/1983 | Ogden | 99/323.2 |
| 4,622,224 | 11/1986 | Owades | 426/16 |

Primary Examiner—Donald E. Czaja
Assistant Examiner—Helen Pratt
Attorney, Agent, or Firm—Kurt Kelman

[57] ABSTRACT

In a process of producing a carbonated hop-malt beverage in which a wort concentrate is produced from malt extract, hop concentrate and yeast by a heat treatment, fermentation, filtration and pasteurization, the wort concentrate is packaged for a long shelf life and for the consumption of the beverage is diluted with water and carbon dioxide, it is desired to produce a beverage which in its taste and consistency and particularly as regards frothing is similar to conventional beer. This is accomplished in that in the preparation of the wort concentrate from dilute malt extract, protein is separated by being heated and precipitated and hop concentrate and yeast are added to the resulting liquor, which is subsequently fermented. After an optional addition of nutrients and aromas to the liquor the fermentation is interrupted by shock cooling. The substrate is filtered, pasteurized and packaged.

To produce the potable beverage that wort concentrate may be supplied at a controlled rate to a mixing stage, in which the wort concentrate is continuously diluted with $CO_2$-containing water and can finally be dispensed under superatmospheric pressure.

10 Claims, 2 Drawing Sheets

PROCESS OF PRODUCING A CARBONATED HOP-MALT BEVERAGE

This invention relates to a process of producing a carbonated hop-malt beverage, in which a wort concentrate is produced from malt extract, hop concentrate and yeast by a heat treatment, fermentation, filtration and pasteurization. The wort concentrate is packaged for a long shelf life and is diluted with water and carbon dioxide for consumption.

The resultant beverage may be dispensed from a dispenser adapted to mix water, $CO_2$ and the concentrate in adjustable proportions.

For a long time there has been desire for a hop-malt beverage which is equal or similar in taste to the conventional kinds of beer but is non-alcoholic or at least has a very low alcohol content. Such a beverage also should be substantially similar or identical to conventional kinds of beer as regards frothing and consistency of froth. The use of a concentrate, to which water and carbon dioxide are added only before the beverage is consumed, decreases the volume and weight to be transported.

It has repeatedly been proposed first to produce a substantially finished, normal beer, then to expel the carbon dioxide ($CO_2$) and to separate the alcohol by fractional distillation, and to thicken the residue so as to obtain a concentrate, from which a potable beverage is produced by admixing it to carbonated water. The taste, consistency and frothing are not satisfactory. Specifically, the thickening and distillation result in a decisive change of the taste from the typical taste of beer. At best, a thickening and a subsequent dilution in a ratio of 1:4 are possible.

Published German Application No. 1,417,566 discloses a process of producing non-alcoholic malt-containing foodstuffs in which a maltose solution is boiled in the presence of a substance which contains tannic acid, such as hops, so that the dregs are separated by flocculation and filtration, and that boiled maltose solution is permitted to cool and is subsequently contacted with brewer's yeast for a short time and is subsequently centrifuged or filtered. In that case the brewer's yeast is used mainly as an agent for assisting the separation of the undesired substances and is prevented by refrigeration from breaking down the maltose. After that treatment the maltose solution is thickened to form a powder or sirup and may then be used as a baking aid or foodstuff as well as for the preparation of non-alcoholic beverages. For the latter purpose the thickened product is diluted with carbonated water. Whereas a taste like that of malt beer can be achieved, the beverage differs from conventional kinds of beer as regards frothing and actual taste. The thickened product is highly hygroscopic and is protected by an admixture of carbon dioxide before it is transported.

Low-alcohol beers or hop-malt beverages can also be made in accordance with special recipes, like conventional kinds of beer, in that the fermentation is interrupted soon so that alcohol is produced only in small quantities. Such beers differ in taste from other kinds of beer and it is virtually impossible to process them so as to form a concentrate.

Dispensers for the preparation of non-alcoholic beverages are known, e.g., from Published German Applications Nos. 28 55 839, 30 46 545, 32 13 580 and 34 17 005, wherein a concentrate is supplied under substantially normal pressure through a metering nozzle or an outlet pipe to a mixing vessel, which is fed in a corresponding proportion which $CO_2$-containing, i.e., carbonated water so that the concentrate and carbonated water mix to form a beverage, which can be discharged from the tap under normal pressure. It is also known to accommodate the supply tank for the concentrate and the carbonizer in an icebox or another refrigerator. In that case there is no strong frothing, as is encountered in the dilution of a wort concentrate. If beer and beerlike beverages were dispensed under normal pressure, the wort concentrate would not be sufficiently dissolved and the correct proportioning of wort concentrate and carbonated water would not be ensured. Other known dispensers, in which a flavor concentrate, such as a fruit juice, is pressurized, are also unsuitable for dispensing hop-malt beverages of the kind mentioned first hereinbefore. Such dispensers comprise $CO_2$ supply tanks and ports for connection to a water line and are adapted to be coupled to pressure-resisting tanks for a flavor concentrate, such as fruit juice. The $CO_2$ line leads to that tank. In that case the $CO_2$ is used to expel the concentrate from the pressure-resisting tank and the $CO_2$-concentrate mixture is introduced through an injector into a line in which the water is conducted so that the components of the beverage are mixed in controlled proportions and the finished beverage can be dispensed under superatmospheric pressure at the tap. In connection with hop-malt beverages of the kind stated the expulsion of the wort concentrate by means of $CO_2$ might give rise to extreme frothing resulting in a malfunction of the entire dispenser.

It is an object of the invention to provide a process for the production of a wort concentrate and of a potable hop-malt beverage with the aid of means which are simpler than those used before and in such a manner that the finished beverage has a taste similar to that of conventional beers can form a froth like that of beer.

The main object set forth is accomplished in according to the invention with a process of producing a wort concentrate having a long shelf life, which comprises the steps of diluting a malt extract containing protein to 30 to 40 Brix, heating the diluted malt extract above the coagulation temperature of protein until the protein has been coagulated, adding a precipitant for the protein, removing the precipitated protein and the precipitant to purify the malt extract, adding hop concentrate and yeast to the purified malt extract to obtain a clear liquor, and fermenting the clear liquor at a temperature of 28° C. and 32° C. to obtain a wort concentrate having an alcohol content not exceeding about 2.5%, by volume. A carbonated hop-malt beverage is produced from this wort concentrate by diluting the wort concentrate at a controlled rate with $CO_2$-containing water to obtain the hop-malt beverage.

The process in accordance with the invention for the preparation of the wort concentrate differs conceptually from the process steps carried out in the conventional production of beer. In the conventional production of beer the dregs, particularly the proteins, are not separated before the fermentation and a useful beverage or a precursor of a beverage is not provided before that separation.

Owing to the recognition that particularly in conjunction with relatively high concentrations of maltose a prolonged fermentation will necessarily result in a high alcohol content, a purification of the malt concentrate to remove protein is performed in the process in accordance with the invention so that a fermentation is not required for that purification. The fermentation which is effected is not intended to transform alcohol but to break down the excess maltose and, at the same time, to generate in the malt concentrate the typical taste of beer without artificial aromas. The fermentation is performed at a high maltose concentration, a high hop content and a constant temperature. For instance, a malt extract is used which has been diluted to values between 30 and 40 Brix (% by volume), particularly 35 Brix, and the fermentation temperature is about 30° C. The fermentation is effected only for about 24 hours or until an alcohol content not in excess of 2.5% by volume has been reached and is then interrupted by shock chilling. The wort concentrate which has been produced under such conditions can be diluted at a ratio from 1:9 to 1:10. Even if the low alcohol content is not expelled during the pasteurization, the finished beverage will have only a negligibly low alcohol content.

After the pasteurization the substrate may be conducted in a stream to the filing station and additional aromas, particularly hop aromas, may be injected during that step in order to obtain certain flavors.

In the preparation of the wort concentrate, a high concentration is achieved and the concentrate will not become cloudy and will preserve a stable aroma structure and will not change its taste even during prolonged storage. It can be diluted so as to form a beerlike froth structure. In that connection an important process step resides in that the concentrate is diluted by an admixing of carbonated water, particularly in a continuous operation, rather than in that the concentrate is injected into the water by means of $CO_2$ as in the conventional vending machines for fruit beverages and the like.

A dispenser for the potable beverage is adapted to mix water, $CO_2$ and the wort concentrate in adjustable proportions so that the finished beverage is dispensed from an outlet, and comprises a cooled carbonizer for producing carbonated water from water and $CO_2$, a mixer connected to the carbonizer, a metering device connecting the mixer to a sterile coupling port, and packages containing the wort concentrate and adapted to be connected under sterile conditions to the coupling port. The mixer has an outlet which communicates through a cooling stage with a tap. The metering device may consist of a diaphragm pump which has an actuating line extending in the $CO_2$ gas stream supplied to the carbonizer. A simple and exact apparatus will be obtained if carbonated water and wort concentrate can be mixed in the correct proportions under superatmospheric pressure in the dispenser and can be dispensed under superatmospheric pressure. An aftercooling and stilling may be effected after the mixing region.

Figure 2:
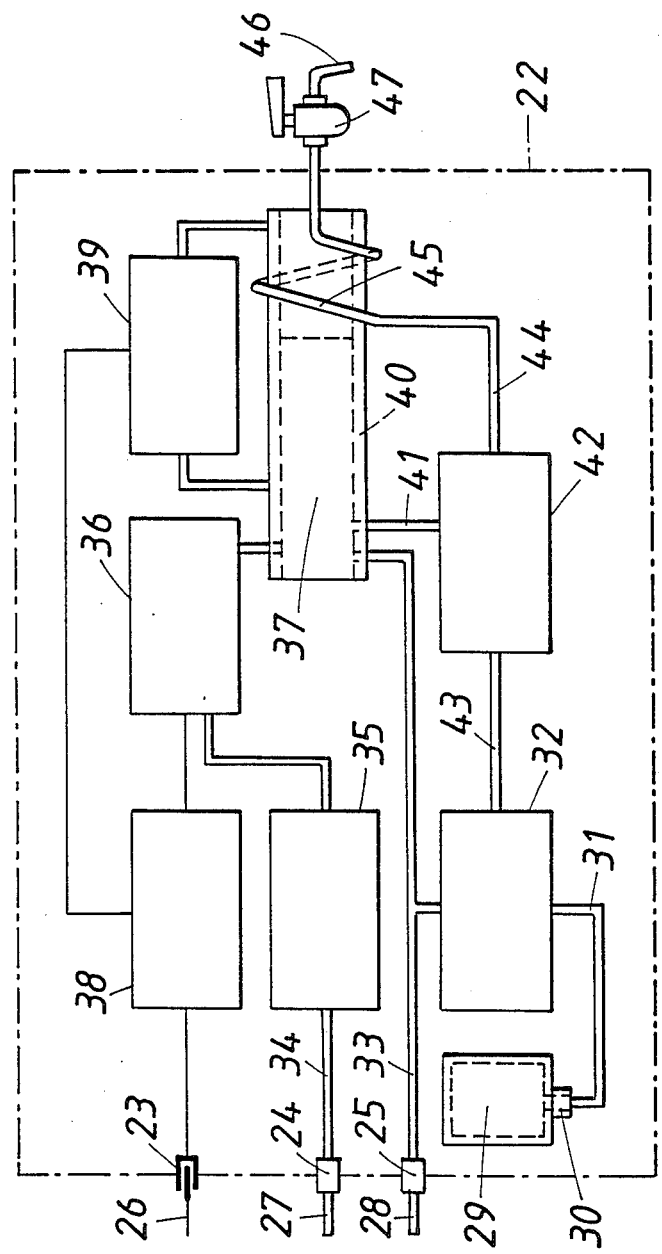

The subject matter of the invention is illustrated by way of example in the drawing. FIG. 1 is a block diagram illustrating the process of preparing the wort concentrate. FIG. 2 is a block diagram of a dispenser.

Liquid, light-colored, tart malt extract, which has been diluted, e.g., to 35 Brix and has been supplied to a container 1 as indicated by the arrow 2, is heated to 75° C. in a process stage 1, in which a precipitant has been added (arrow 3). The precipitant effects a precipitation of the protein, which coagulates as it is heated and is subsequently removed together with the precipitant, which may consist of calcined alumina (arrow 4).

The thus prepurified malt extract is left for a predetermined period of time in a decanting stage 5. The resulting sump consisting of dregs is removed (arrow 6) so that a malt-containing clear liquor is left. In a process stage 7, hop concentrate (arrow 8) is added to that liquor. A special yeast (brewer's yeast, arrow 10) is added in a process stage 9.

After the addition of hops and yeast to the clear liquor, the latter is fermented in a process stage 11 at a controlled temperature of, e.g., 30° C. for a selected time of, e.g., 24 hours or until a predetermined alcohol content of, e.g., 2.5% by volume has been reached. The excessive maltose is broken down at the same time. Additional nutrients or aromas, hop concentrate and the like are added in a process stage 12 (arrow 13). In a succeeding process stage 14 the fermentation is interrupted by a shock cooling to the freezing point. The resulting wort is filtered over kieselguhr in a process stage 15 so that a clear wort becomes available in a stage 16. That clear wort is then caused to flow through a stage 17, in which it is pasteurized by being heated to 95° C., close to its boiling point, for 30 seconds. Thereafter the wort is cooled immediately in a stage 18. Additional hop substances or aromas may be injected into the pasteurized and cooled clear wort as it flows through a stage 19 of the process (arrow 20). The quantity of said additions is less than 10% of the total volume. In a succeeding stage 21 of the process the wort concentrate is filled at a controlled rate and under sterile conditions into supply containers, particularly into containers in which a stable outer vessel contains a sheet liner which collapses as the container is emptied. In such containers the wort concentrate may be stored and/or transported to the consumers and can be used there, e.g., in dispensers as shown in FIG. 2.

A dispenser as shown in FIG. 2 has, e.g., a box 22, which is provided with plug couplings 23, 24, 25 or other couplings for connection to an electric lead 26, a water line 27 and a line 28, which leads to a supply of $CO_2$. A supply tank 29 having a downwardly facing discharge opening is adapted to be replaceably inserted into the box 22. That supply tank contains the wort concentrate. A connection to a line 31 is made by a sterile coupling 30. The line 31 leads to a metering pump, e.g., a diaphragm pump 32, which is pneumatically operated and for this purpose is connected to the $CO_2$-line 33, which extends inside the box 22.

A water line 34 is connected to the coupling 24 and extends through a processing plant 35, which contains filters, desalting means etc. The water line 34 leads to a metering pump 36 unless a constant water pressure is ensured and otherwise extends into the mixing chamber of a carbonizer 37, in which the $CO_2$ line 33 opens too. The pump 36 may be associated with an electric motor, which is controlled by a switching unit 38. The switching unit 38 controls also the motor 39 for a refrigerating compressor, which supplies refrigerant to a cooling jacket 40 of the carbonizer 37. In the carbonizer 37 the water and the $CO_2$ are mixed to produce carbonated water, which is supplied through a line 41 to a mixer 42, which is also connected to the metering pump 32 by a line 43. In the mixer 42 the carbonated water and the wort concentrate are mixed in a controlled ratio. The finished beverage is conducted in a line 44 to cooling coils 45, which surround the cooling jacket 40 and effect an aftercooling and stilling and is finally conducted to an outlet 46, which is preceded by a tap 47.

In the embodiment shown in FIG. 2, an opening of the tap 47 will cause additional beverage to flow to the outlet 46. The pressure in the carbonizer 37 is reduced at the same time. Follow-up $CO_2$ gas actuates the metering pump 32, which now supplies the mixer 42 with wort concentrate at a predetermined ratio to the $CO_2$ gas. The supply of water is controlled by the control device 38 and the pump 36. The refrigerating means 38, 40 may be used to produce a supply of ice in the carbonizer 37 so that a buffer operation involving a dispensing of large quantities during rush hours can be performed even though the total refrigerating capacity is relatively low.

Example

In the process stage 1, 100 kg malt extract are diluted with 196 kg $H_2O$ and are heated to 75° C. in conjunction with an addition of 5 kg calcined alumina. The protein coagulates owing to the temperature rise and is separated in a separator, which may consist of a centrifuge or may contain filter cloths, together with the calcined alumina, which constitutes the precipitant.

The thus prepurified malt extract is allowed to stand in the decanting stage 5 for two hours and is then decanted from the dregs. In dependence on the desired taste, 0.7 to 3 kg hop concentrate and subsequently 1.5 kg special yeast are added in the process stage 7.

After the addition of hops and yeast the clear liquor is left in the process stage at 30° C. for 24 hours so that an alcohol content of 2.5% by volume is obtained.

In the process stage 12, additional nutrients and aromas, e.g., 100 g citric acid to provide a tart taste, are added. In a succeeding proces stage 14 the fermentation is interrupted by a shock cooling to the freezing point and a filtration over kieselguhr succeeds the process stage 15. The flowing clear wort is pasteurized by being heating to 95° C. for 30 seconds and is subsequently cooled in stage 18. Additional hop substances and aromas can be added in process stage 19, virtually in one-half of the quantity in which they have been added in process stage 12. The wort concentrate is subsequently filled in a cold state into the packaging containers, which preferably have a capacity of 10 kg.

I claim:

1. A process of producing a wort concentrate having a long shelf life, which comprises the steps of
   (a) diluting a malt extract containing protein to 30 to 40 Brix,
   (b) heating the diluted malt extract above the coagulation temperature of protein until the protein has been coagulated,
   (c) adding a precipitant for the protein,
   (d) removing the precipitated protein and the precipitant to purify the malt extract, to obtain a clear liquor
   (e) adding a hop concentrateand yeast to the clear liquor, and
   (f) fermenting the clear malt extract liquor at a temperature of 28° C. and 32° C. to obtain a wort concentrate having an alcohol content not exceeding about 2.5%, by volume.

2. The process of claim 1, wherein the malt extract is diluted to 35 Brix.

3. The process of claim 1, wherein the coagulation temperature is about 75° C.

4. The process of claim 1, wherein the precipitant is calcined alumina.

5. The process of claim 1, comprising the further step of adding nutrients and aromas to the clear liquor.

6. The process of claim 1, comprising the further steps of interrupting the fermentation by shock cooling, filtering the cooled wort concentrate to obtain a clear wort concentrate, and pasteurizing the clear wort concentrate.

7. The process of claim 6, comprising the further step of adding hop aromas to the pasteurized clear wort concentrate.

8. A process of producing a carbonated hop-malt beverage from a wort concentrate having a long shelf life, which comprises the steps of
   (a) diluting a malt extract containing protein to 30 to 40 Brix,
   (b) heating the diluted malt extract above the coagulation temperature of protein until the protein has been coagulated,
   (c) adding a precipitant for the protein,
   (d) removing the precipitate protein and the precipitant to purify the malt extract, and to obtain a clear liquor
   (e) adding hop concentrate and yeast to the clear liquor, and
   (f) fermenting the clear malt extract liquor at a temperature of 28° C. and 32° C. to obtain a wort concentrate having an alcohol content not exceeding about 2.5%, by volume, and
   (g) diluting the wort concentrate at a controlled rate with $CO_2$-containing water to obtain the hop-malt beverage.

9. The process of claim 8, wherein the rate of wort concentrate to $CO_2$-containing water is from 1:9 to 1:10.

10. The process of claim 8, comprising the further steps of cooling the hop-malt beverage and dispensing the cooled beverage under superatmospheric pressure.

* * * * *